United States Patent
Kastenschmidt et al.

(10) Patent No.: US 6,739,349 B2
(45) Date of Patent: May 25, 2004

(54) BULK MILK TANK WITH ADJUSTABLE LADDER

(75) Inventors: Kevin M. Kastenschmidt, Rockland, WI (US); Edward L. Knower, Holmen, WI (US)

(73) Assignee: WestfaliaSurge, Inc., Naperville, IL (US)

(*) Notice: Subject to any disclaimer, the term of this patent is extended or adjusted under 35 U.S.C. 154(b) by 0 days.

(21) Appl. No.: 10/167,049

(22) Filed: Jun. 11, 2002

(65) Prior Publication Data

US 2003/0226595 A1 Dec. 11, 2003

(51) Int. Cl.[7] .............................. G05D 7/00; F06C 5/24
(52) U.S. Cl. .................... 137/15.16; 137/351; 137/585; 182/106; 182/127
(58) Field of Search .................... 182/83, 106, 115, 182/127, 207, 585, 351; 137/585, 351, 15.08, 15.16

(56) References Cited

U.S. PATENT DOCUMENTS

| 1,400,481 | A | * | 12/1921 | Evans | 182/127 |
|---|---|---|---|---|---|
| 2,860,822 | A | | 11/1958 | Smith et al. | |
| 3,112,010 | A | | 11/1963 | Mihalik | |
| 4,371,056 | A | * | 2/1983 | Anglade | 182/127 |
| 4,753,321 | A | * | 6/1988 | Winslow | 182/145 |
| 4,848,517 | A | | 7/1989 | Broyles, III | |
| 5,033,582 | A | | 7/1991 | Hoben | |
| 5,064,022 | A | | 11/1991 | Graham | |
| 5,339,996 | A | | 8/1994 | Dubbert et al. | |
| 6,003,633 | A | | 12/1999 | Rolson | |

* cited by examiner

Primary Examiner—A. Michael Chambers
(74) Attorney, Agent, or Firm—Smith & Amundsen

(57) ABSTRACT

A bulk milk tank having a ladder that provides access to a raised platform in a lowered position and moves to a raised position to provide ample operating room around the tank outlet valve.

10 Claims, 4 Drawing Sheets

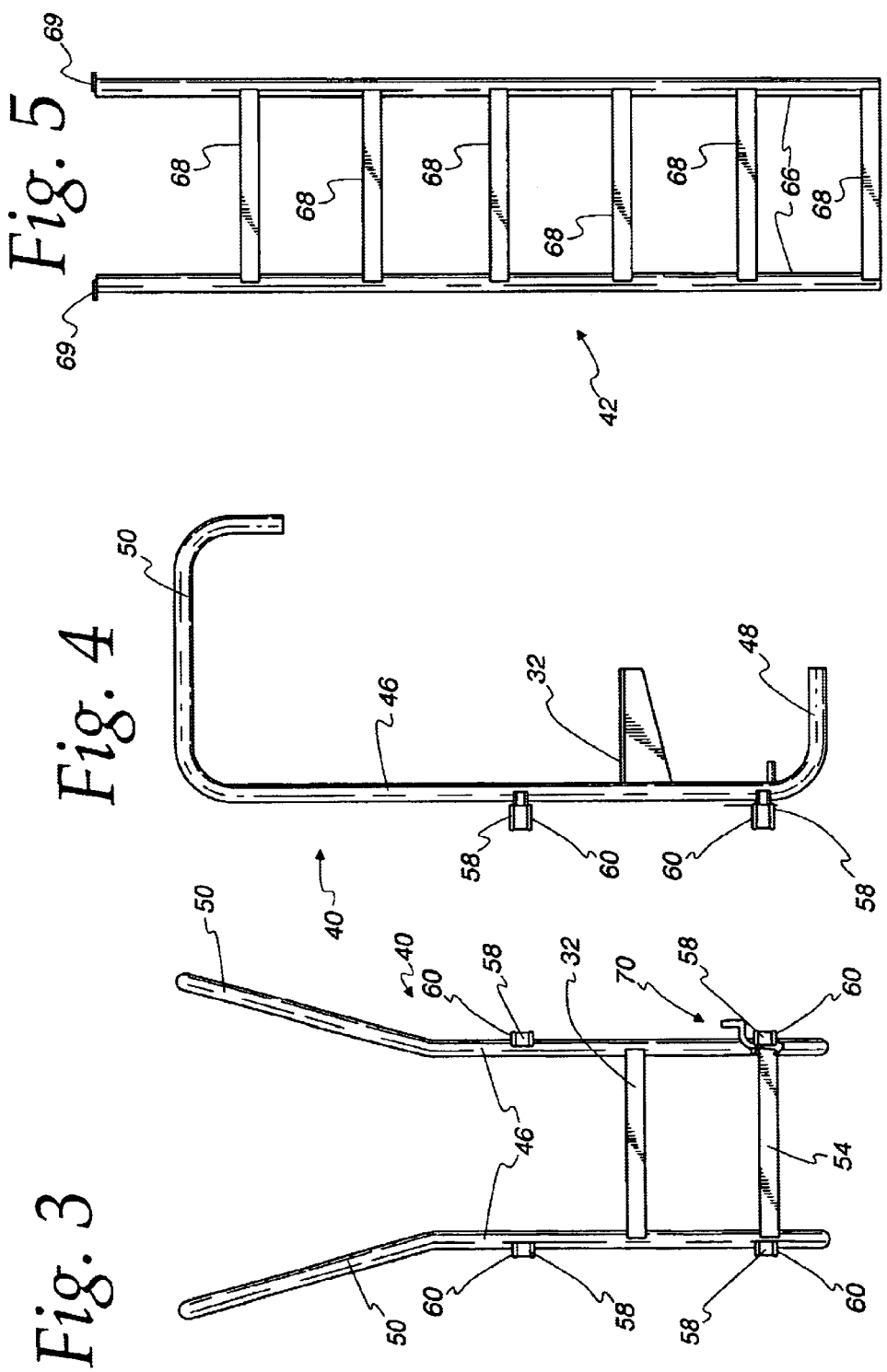

BULK MILK TANK WITH ADJUSTABLE LADDER

FIELD AND BACKGROUND OF THE INVENTION

This invention relates generally to bulk milk tanks used in dairies, and more particularly to a bulk milk tank with an attached ladder that provides access to a raised platform for monitoring a milk gauge and obtaining milk samples. At least a portion of the ladder can be moved away from a tank outlet valve to provide easier access to the outlet valve.

In dairies, milk is collected from a number of cows through a milking system and directed to a bulk milk tank for storage until the milk is transported off site. Bulk milk tanks are typically quite large cylindrical shapes with a longitudinal axis that is oriented horizontally. The ends of the tank are capped with convex ends to provide maximum storage capacity.

Space being at a premium in many dairies, the tanks are designed to have all of their necessary functional elements accessible at one end of the tank. These elements include: an external milk gauge rod for determining the quantity of milk in the tank; an outlet valve for connecting to wash pumps, off-load pumps, or milk inlet lines; an access hatch on the top or end of the tank for obtaining milk samples; an elevated platform for operators to stand on while reading the milk gauge and taking milk samples; and a ladder for the operator to reach the platform.

For safety reasons, the ladder is mounted on the tank to avoid the dangers associated with using a separate, and possibly unstable, ladder resting on the floor. Attached ladders provide operators with secure movement to and from the elevated platform.

Unfortunately, ladders fixed to the end of a bulk milk tank consume a lot of space. Access to other elements, such as the outlet valve, can be inhibited by the ladder. Thus, what is needed is a bulk milk tank with a securely attached ladder that provides access to the elevated platform and ample clearance to use the outlet valve.

SUMMARY OF THE INVENTION

The present invention is directed to a bulk milk tank having an attached ladder that moves between a lowered position to provide access to an elevated platform and a raised position to provide clearance for an outlet valve mounted near the tank bottom. This ladder provides benefits that are not known in any prior milk tank ladder.

In its lowered position, the ladder provides access to the upper platform of the bulk milk tank. From the platform, milk samples and quantity readings can take place. After sampling, a portion of the ladder can be moved to a raised position to provide clearance and easy access to the milk outlet valve, which would otherwise be at least partially blocked by the ladder.

Preferably, the ladder includes a lower section that slides relative to the upper section and is locked in the raised position by a pivoting latch.

Risers to act as handrails can also be included, particularly near the top so that the user can move easily from the ladder to the tank platform and back again.

BRIEF DESCRIPTION OF THE DRAWINGS

FIG. 3 is a front view of an upper section of a milk tank ladder in accordance with the present invention.

FIG. 4 is a side view of the ladder upper section of FIG. 3.

FIG. 5 is a front view of a ladder lower section in accordance with the present invention.

DETAILED DESCRIPTION OF THE PREFERRED EMBODIMENTS

Figure 1:
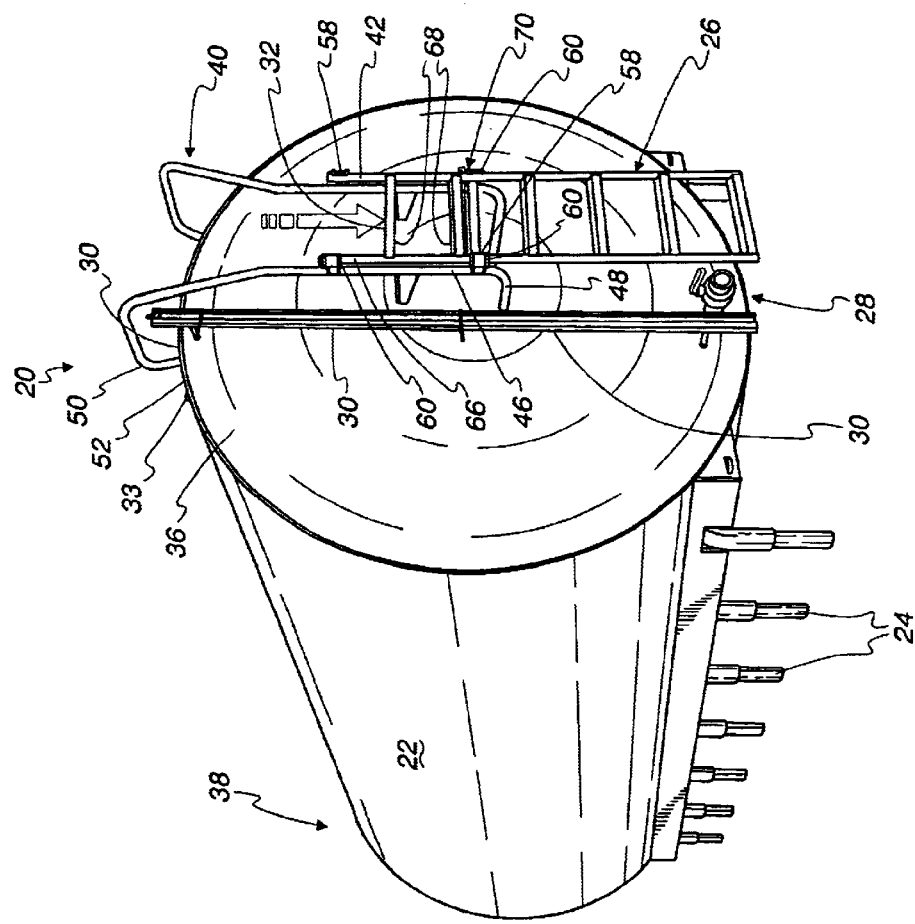
FIG. 1 is a perspective view of a bulk milk tank with a ladder in a lowered or climbing position in accordance with the present invention.

Illustrated in FIG. 1 is a bulk milk tank and ladder system 20 in accordance with the present invention. The bulk milk tank and ladder system 20 includes a milk storage tank 22, a series of supporting legs 24, a ladder 26, an outlet valve 28, a milk gauge 30, and a platform 32.

The milk tank 22 is preferably made of stainless steel and can hold from 600 gallons to 8000 gallons of milk from dairy animals being milked in a dairy. The tank 22 is generally cylindrical and has a substantially horizontal longitudinal axis extending from front 36 to back 38 of the tank 22. The tank 22 is supported above a floor by legs 24.

The front 36 of the tank 22 is preferably substantially round in cross-section and is convex to increase tank storage capacity. The surface of the tank 22 is smooth and has no integral means for ascending to the access hatch 33. Instead, a ladder 26 is joined to the front of the tank 22 by any suitable means including welds, bolts, or other type of fastener.

The ladder 26 includes an upper section 40 and a lower section 42. As seen in FIGS. 3 and 4, the upper ladder section 40 includes a pair of posts 46 that are oriented generally vertically and spaced apart from the upper portion of the tank front 36 to provide an easy handhold and clearance for the operator's feet while climbing. Joined to the bottom of the posts 46 are horizontal struts 48 that join the tank 22 to the posts 46 to maintain spacing.

Figure 6:
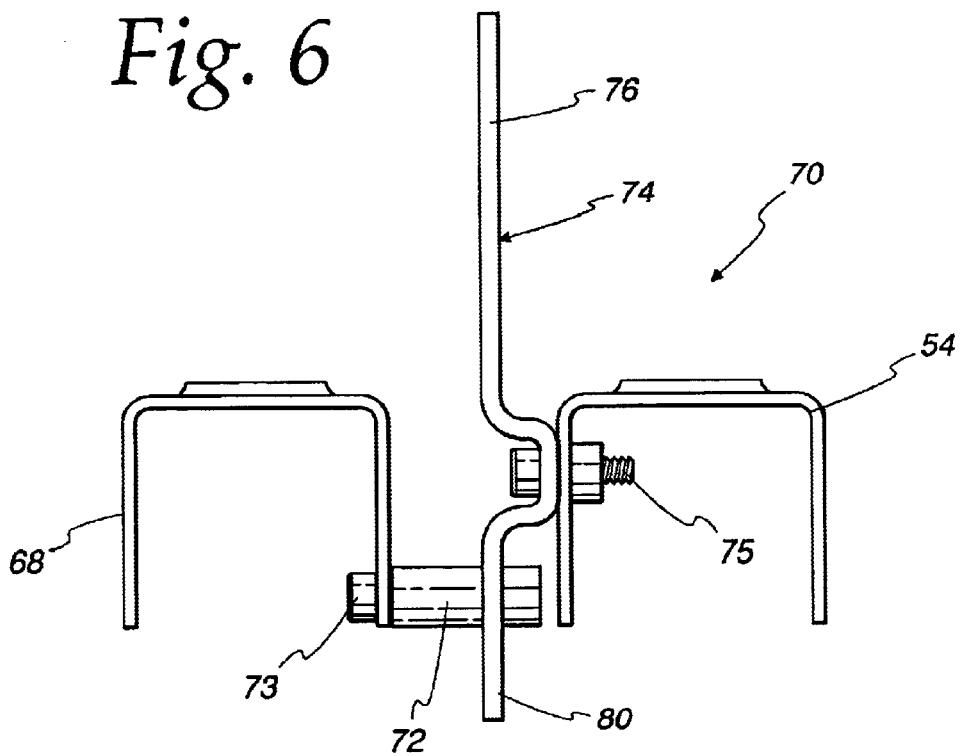
FIG. 6 is a side elevation view of a lock to releasably maintain a lower ladder section in a raised position, in accordance with the present invention.

At the top of the posts 46 are risers 50 that spread outwardly from the posts 46 to provide handrails and ample working space for taking samples through the access hatch 33. The risers 50 are joined to the topside 52 of the tank 22. A ladder rung 54 spans the space between the posts 46. The number of ladder rungs is not critical so long as all applicable safety codes and regulations are met. Preferably, the ladder rungs 54 are an inverted U-shape and have perforations for traction. (See: FIG. 6.)

Also joined to the posts 46, is a platform 32 on which an operator can stand while taking measurements from the milk gauge 30 or taking samples through the access hatch 33. The platform 56 is joined to or is part of the ladder 26 in preferred embodiments, but a separate platform could be attached to the tank 22. The platform 32 is preferable to a ladder rung because there is more space to support the operator and less chance for foot fatigue or slipping.

Figure 2:
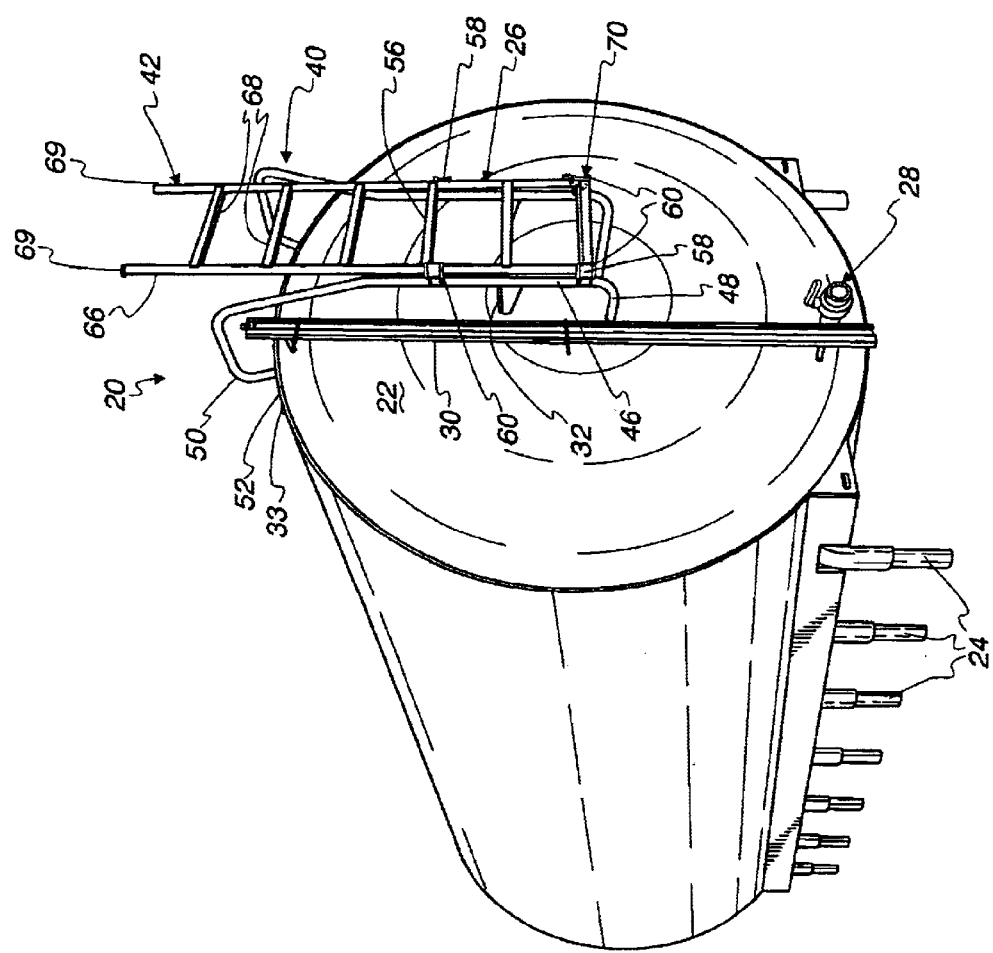
FIG. 2 is a perspective view of the bulk milk tank of FIG. 1 with the ladder in a raised position.

The posts 46 also include four brackets 58 that serve to joint the upper ladder section 40 to the lower ladder section 42. The brackets 58 are generally c-shaped and open inward toward the center of the ladder 26. Inside of the c-shaped brackets are bushings 60 (See: FIG. 2), preferably plastic, that provide a close and low friction fit with the lower ladder section 42.

All of the components described above as being part of the upper ladder section 40 can be welded together to form a single weldment that itself is welded to the tank 22. Otherwise, these same components can be joined to one another and the tank 22 in any suitable fashion.

The lower ladder section 42 (FIG. 5) includes a pair of substantially vertical posts 66 that are sized to mate with the bushings 60 in the brackets 58 of the upper ladder section 40. Spanning the distance between the posts 66 are rungs 68, preferably six (6) in number and welded to the posts 66. More or fewer rungs 68 can be used to compliment the size of the milk tank 22 on which the ladder 26 is mounted. On top of the posts 66 are caps 69 that are oversized relative to the cross-sectional area of the posts 66 so that they act as stops to prevent the lower ladder section 42 from sliding out of the brackets 58 of the upper ladder section 40.

With this construction, the ladder 26 can be used in a climbing position (FIG. 1) to access the platform 32 or in the raised position (FIG. 2) to have clearance for the outlet valve 28 by sliding the lower ladder section 42 relative to the upper ladder section 40.

A lock 70 is used to secure the lower ladder section 42 in its raised position (FIG. 2) while the outlet valve 28 is being accessed by an operator.

Figure 7:
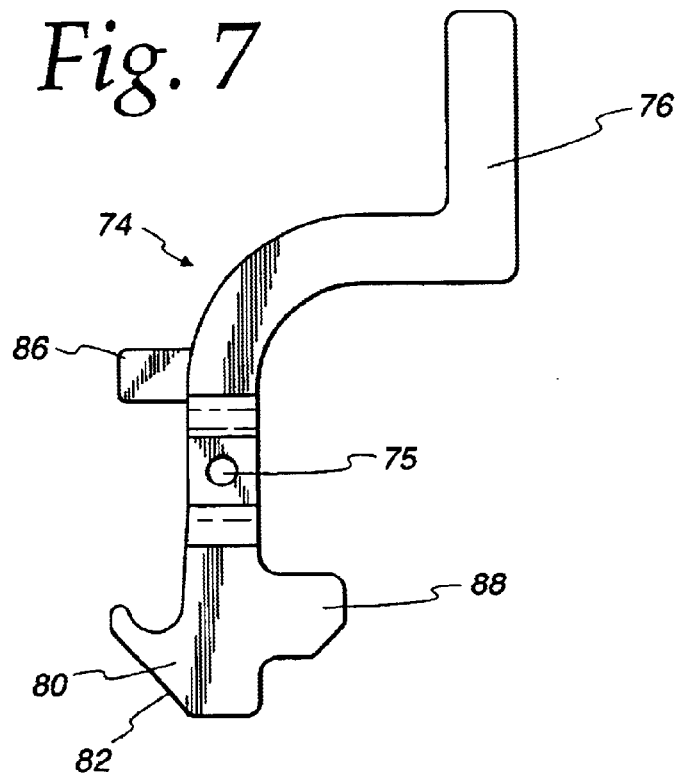
FIG. 7 is a front elevation view of a pivoting lock latch used in the lock of FIG. 6.

A lock 70 for use with the present invention is illustrated in FIGS. 6 and 7. The lock 70 includes a pin 72 joined to or molded integrally with the lower ladder section 42, and preferably to a rung 68 of the lower ladder section 42 via a bolt 73. The lock 70 also includes a pivoting latch 74 that is joined to the upper ladder section 40 via a bolt 75. The latch 74 engages the pin 72 to maintain the lower ladder section 42 safely and conveniently clear of the outlet valve 28 in the raised position.

The pivoting latch 74 includes an upper handle portion 76 that can be manipulated from outside of the ladder post 46 to avoid a pinch point. On the opposite end is a hook 80 that is sized and shaped to mate with the pin 72.

On the underside of the hook 80 is a cam surface 82 that is engaged by the pin 72 when the lower ladder section 42 is being raised. The engagement of the pin 72 and the cam surface 82 pivots the latch 74 (counter-clockwise as viewed) enough to allow the pin 72 to be raised above the latch 74. Either gravity, a spring, or manipulation by the user pivots the latch 74 (clockwise as viewed) to position the hook 80 under the pin 72, so that slight downward movement of the lower ladder section 42 engages the pin 72 and the hook 80 to secure the lower ladder section 42 in a raised position.

In a preferred embodiment, a tab 88 is formed on the hook 80 to add mass to the latch 74. With the added mass, gravitational force is enough to rotate the latch 74 in a clockwise direction to a position that will support the pin 72. In addition, a spring could be used to assist in the rotation of the latch 74, but one is not necessary in the illustrated, preferred embodiment.

A stud 86 engages the pin 72 in the event an operator raises the lower ladder section 42 too far. The stud 86 thereby limits how far the lower ladder section 42 can be raised.

To lower the lower ladder section 42 to the climbing position, the operator slightly raises the lower ladder section 42 to clear the hook 80. The operator then uses the upper handle portion 76 of the latch 74 to pivot the latch 74 counter-clockwise while simultaneously lowering the lower ladder section 42 toward the climbing position. Once the pin 72 is below the latch 74, the latch 74 can be released.

The lock 70 is illustrated as a latch and pin combination, but any type of mechanism that maintains the lower ladder section 42 in the raised position can be used.

Aside from the plastic bushings 60, all of the ladder elements are preferably made of stainless steel.

The illustrated embodiment has a lower ladder section 42 that slides relative to the upper ladder section 40, but it is possible to join the sections with hinges to pivot the lower section upward to provide access to the outlet valve. In all of these embodiments, the ladder has essentially two positions. First a climbing position to provide climbing access to the elevated platform. Second, a raised position where a section of the ladder is moved away from the outlet valve to permit necessary operations to take place on the valve. Nonetheless, the sliding embodiments require no clearance for the lower section to swing through, so the sliding version is more space economical.

The foregoing detailed description is provided for clearness of understanding only and no unnecessary limitations therefrom should be read into the following claims.

What is claimed is:

1. A method for operating a bulk milk tank, the bulk milk tank having a top side, an end, an outlet valve disposed in the tank's end, and a ladder operatively joined to the tank and having upper and lower sections, the method comprising the steps of alternatingly:

lowering the ladder's lower section into a climbing position that permits operator access to the top side of the bulk milk tank and at least partially inhibits access to the outlet valve;

raising the ladder's lower section to a raised position that permits operator access to the outlet valve to remove milk from the bulk tank; and locking the ladder's lower section into the raised position.

2. The method for operating a bulk milk tank of claim 1, wherein the step of lowering the ladder's lower section to the climbing position permits operator access to an operator platform joined to the ladder's upper section.

3. The method for operating a bulk milk tank of claim 1, wherein the steps of raising and lowering the lower ladder section includes the steps of sliding the lower ladder section relative to the upper ladder section.

4. The method for operating a bulk milk tank of claim 1 wherein the steps of raising and lowering the ladder's lower section comprises the steps of:

sliding substantially vertical posts in the lower ladder section relative to brackets in the upper ladder sections, the vertical posts disposed at least partially within the brackets.

5. The method for operating a bulk milk tank of claim 1, wherein the step of locking the lower ladder section in the raised position comprises the step of engaging a lower ladder section pin with an upper ladder section pivoting latch.

6. A bulk milk tank comprising:

a top side, an end, an outlet valve disposed in the end of the tank, and a ladder, the ladder comprising:

an upper ladder section fixed to the tank;

a lower ladder section joined to the upper ladder section for movement between a climbing position and a raised position, whereby climbing access to the top side is provided in the climbing position and operating clearance to the outlet valve is provided when in the raised position; and a lock joined to the ladder to releaseably maintain the lower ladder section in the raised position.

7. The bulk milk tank of claim 6, wherein the ladder further comprises:

an elevated platform joined to the ladder upper section.

8. The bulk milk tank of claim 6, wherein the ladder lower section slides relative to the upper section between the raised and climbing positions.

9. The bulk milk tank of claim 6, wherein:
- the lower ladder section includes substantially vertical posts; and
- the upper ladder section includes a plurality of brackets for mating with the lower section posts to provide sliding engagement of the lower section between the raised and climbing positions.

10. The bulk milk tank of claim 6, wherein the lock for maintaining the ladder lower section in the raised position comprises:
- a pin joined to the lower ladder section; and
- a pivoting latch to engage and maintain the pin in the raised position.

* * * * *